(12) United States Patent
Oka (10) Patent No.: US 12,338,916 B2
(45) Date of Patent: Jun. 24, 2025

(54) SPECIFICATION DETERMINATION METHOD OF FIBER REINFORCED MEMBER FOR MARINE HOSE AND METHOD OF PRODUCING MARINE HOSE

(71) Applicant: THE YOKOHAMA RUBBER CO., LTD., Hiratsuka (JP)

(72) Inventor: Tomoki Oka, Kanagawa (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 0 days.

(21) Appl. No.: 18/720,009

(22) PCT Filed: Nov. 25, 2022

(86) PCT No.: PCT/JP2022/043510
§ 371 (c)(1),
(2) Date: Jun. 14, 2024

(87) PCT Pub. No.: WO2023/153047
PCT Pub. Date: Aug. 17, 2023

(65) Prior Publication Data
US 2024/0418300 A1 Dec. 19, 2024

(30) Foreign Application Priority Data
Feb. 9, 2022 (JP) ................................ 2022-018718

(51) Int. Cl.
*F16L 11/08* (2006.01)
*F16L 11/133* (2006.01)

(52) U.S. Cl.
CPC ............. *F16L 11/08* (2013.01); *F16L 11/133* (2013.01)

(58) Field of Classification Search
CPC .......... F16L 11/08; F16L 11/133; F16L 23/12; D10B 2331/04; D03B 1/00; D03B 13/008; D03D 15/41; D03D 19/00; B32B 1/08; B32B 5/24; D02G 3/447

USPC ........................................................... 264/241
See application file for complete search history.

(56) References Cited

U.S. PATENT DOCUMENTS

| 6,112,771 A | 9/2000 | Aoyagi et al. |
| 2013/0291989 A1 | 11/2013 | Gray et al. |

FOREIGN PATENT DOCUMENTS

| JP | H09-14519 A | 1/1997 |
| JP | H10-157016 A | 6/1998 |
| JP | 2004-108555 A | 4/2004 |
| JP | 2013-249932 A | 12/2013 |
| JP | 2017-150105 A | 8/2017 |
| JP | 2021-148193 A | 9/2021 |

OTHER PUBLICATIONS

Machine English Translation of JP 2021155871 (Year: 2021).*

* cited by examiner

*Primary Examiner* — Hannah J Pak
(74) *Attorney, Agent, or Firm* — Carrier, Shende & Associates P.C.; Joseph P. Carrier; Fulchand P. Shende (57) ABSTRACT

A marine hose has a twist coefficient $1900 \leq K \leq 2900$ of fiber cords constituting a fiber reinforced member with three or four twisted filaments made of polyester, an interrelationship R between a predetermined elongation ratio E2 of a plurality of types of the fiber cords having different specifications and a hose elongation ratio E1 in a predetermined expansion test of each of marine hoses in which the fiber reinforced member including the respective fiber cords as constituent members is embedded as reinforcing layers is determined in advance. A threshold Th of the ratio E2 is set based on a standard value of hose elongation ratio E1 in the predetermined expansion test and the interrelationship R and the predetermined elongation ratio E2 of the fiber cords used as the reinforcing layers is set to the threshold Th or less.

7 Claims, 7 Drawing Sheets

SPECIFICATION DETERMINATION METHOD OF FIBER REINFORCED MEMBER FOR MARINE HOSE AND METHOD OF PRODUCING MARINE HOSE

TECHNICAL FIELD

The present invention relates to a specification determination method of a fiber reinforced member for a marine hose and a method of producing the marine hose and particularly relates to a specification determination method of a fiber reinforced member for a marine hose having excellent fatigue resistance that allows ensuring sufficient pressure resistance while appropriately maintaining expansion characteristics of the marine hose and a method of producing the marine hose.

BACKGROUND ART

A plurality of reinforcing layers are embedded in a marine hose. As these reinforcing layers, for example, a fiber reinforced member constituted by weaving fiber cords into a cord fabric is used (for example, see the paragraph 0011 of Patent Document 1 and the paragraph 0023 of Patent Document 2). These reinforcing layers suppress excessive expansion of a hose body against an internal pressure applied to the marine hose by a fluid flowing through a flow path and ensure defined pressure resistance.

As a certification test of the marine hose, a breaking test is performed by applying an internal pressure to break the marine hose after a bending test is performed by the defined number of times. In this bending test, since a fiber cord constituting the fiber reinforced member is repeatedly bent and fatigued, and therefore when the fatigue resistance of the fiber cord is inferior, it is difficult to ensure the defined pressure resistance required for the marine hose. To improve the fatigue resistance of the fiber cord, it is effective to increase the number of twists of the fiber cord. However, the increase in the number of twists of the fiber cord is disadvantageous in suppressing elongation of the marine hose to which the internal pressure is applied. Accordingly, it becomes difficult to satisfy expansion characteristics (standard value of elongation ratio) required in a predetermined expansion test for a marine hose.

It has been proposed to use a twisted yarn made of two polyester filaments as the fiber cord so as to have a primary cable twist coefficient of about 1000 to 2500 and a secondary cable twist coefficient of about 1500 to 3600 (see claims and the paragraphs 0066 to 0069 of Patent Document 3). However, it is difficult to obtain sufficient cord strength with such a fiber cord formed by twisting the two polyester filaments. Therefore, in a marine hose in which a reinforcing layer using this fiber cord is embedded, it is necessary to embed a further large amount of the reinforcing layer to ensure defined pressure resistance. Therefore, further improvement is required to obtain a fiber reinforced member having excellent fatigue resistance that allows ensuring sufficient pressure resistance while appropriately maintaining expansion characteristics of the marine hose.

CITATION LIST

Patent Document

Patent Document 1: JP 10-157016 A
Patent Document 2: JP 2021-148193 A
Patent Document 3: JP 2017-150105 A

SUMMARY OF INVENTION

Technical Problem

An object of the present invention is to provide a specification determination method of a fiber reinforced member for a marine hose having excellent fatigue resistance that allows ensuring sufficient pressure resistance while appropriately maintaining expansion characteristics of the marine hose and a method of producing the marine hose.

Solution to Problem

To achieve the object, a specification determination method of a fiber reinforced member for a marine hose according to an embodiment of the present invention, in the specification determination method of the fiber reinforced member having a cord fabric structure used as a reinforcing layer of the marine hose and including many fiber cords arranged in parallel and a transverse cord transversing the fiber cords so as to weave the fiber cords, may include: setting a twist coefficient K of the fiber cords calculated by a following formula (1) to 1900 or more and 2900 or less with a specification of the fiber cords in which three or four filaments made of polyester are twisted; grasping an interrelationship between a predetermined elongation ratio of a plurality of types of the fiber cords having different specifications and a hose elongation ratio in a predetermined expansion test of each of the marine hoses in which the fiber reinforced member including the respective fiber cords as constituent members is embedded as the reinforcing layer in advance; setting a threshold of the predetermined elongation ratio based on a standard value of the hose elongation ratio in the predetermined expansion test required for the marine hose and the interrelationship; and setting the predetermined elongation ratio of the fiber cords used as the reinforcing layer to the threshold or less.

$$\text{Twist coefficient } K = T \times D^{1/2} \tag{1}$$

Here, T is a secondary cable twist count of the fiber cord (count/10 cm) and D is a total fineness of the fiber cord (dtex).

A method of producing a marine hose according to an embodiment of the present invention may include: embedding the fiber reinforced member having the specification determined by the specification determination method of the fiber reinforced member described above as the reinforcing layer between an inner surface layer and a cover layer to form an unvulcanized hose molded article; and vulcanizing the hose molded article.

Advantageous Effects of Invention

According to the specification determination method of the fiber reinforced member for the marine hose according to an embodiment of the present invention, the twist coefficient K of the fiber cords constituting the fiber reinforced member having the cord fabric structure is set to 1900 or more and 2900 or less with the specification of the fiber cords in which the three or four filaments made of polyester are twisted. This is advantageous in ensuring sufficient pressure resistance of the marine hose as well as improving fatigue resistance of the fiber cords. Further, the threshold of the predetermined elongation ratio is set based on the standard value of the hose elongation ratio and the interrelationship, and the predetermined elongation ratio of the fiber cords used as the reinforcing layer is set to the threshold or less. As a result, in the marine hose in which the fiber reinforced members including the fiber cords as the constituent members are embedded as the reinforcing layers, excessive elongation of a hose body when an internal pressure is applied is avoided, which is advantageous for appropriately maintaining expansion characteristics of the marine hose.

DESCRIPTION OF EMBODIMENTS

The following will describe a specification determination method of a fiber reinforced member for a marine hose and a method of producing the marine hose according to an embodiment of the present invention with reference to the drawings.

A marine hose 1 illustrated in FIGS. 1 to 4 as an example includes, at both ends in a longitudinal direction of a cylindrical hose body 1A, connection fittings 2 for connecting to the other marine hoses 1. The connection fitting 2 includes a nipple 2b extending in the longitudinal direction of the marine hose 1 and a flange 2a joined to one end of the nipple 2b in the longitudinal direction. Generally, about the 8 to 10 marine hoses 1 are connected and used.

Figure 1:
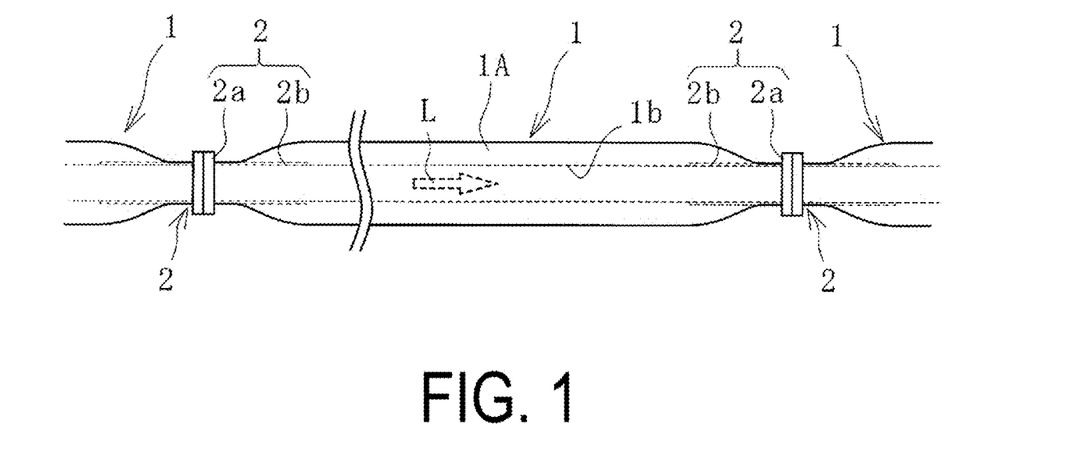
FIG. 1 is an explanatory diagram illustrating an example of a marine hose produced according to an embodiment of the present invention.
Figure 2:
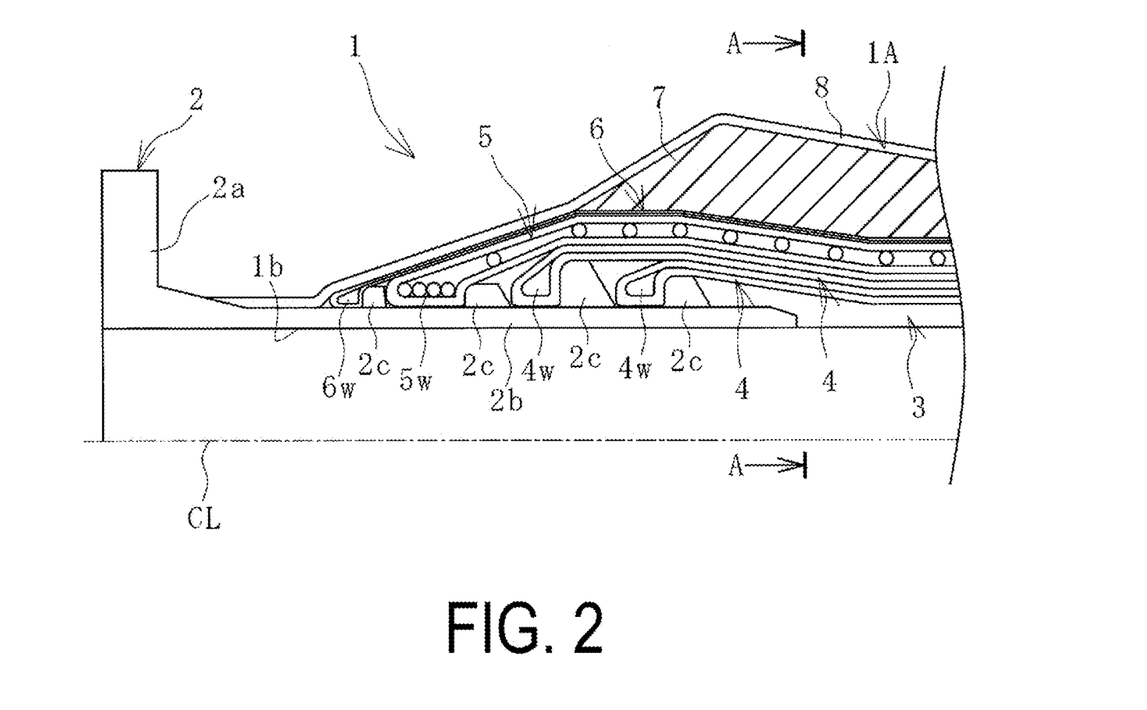
FIG. 2 is an explanatory diagram illustrating an example of a portion of the marine hose in FIG. 1 enlarged in a longitudinal cross-sectional view.
Figure 3:
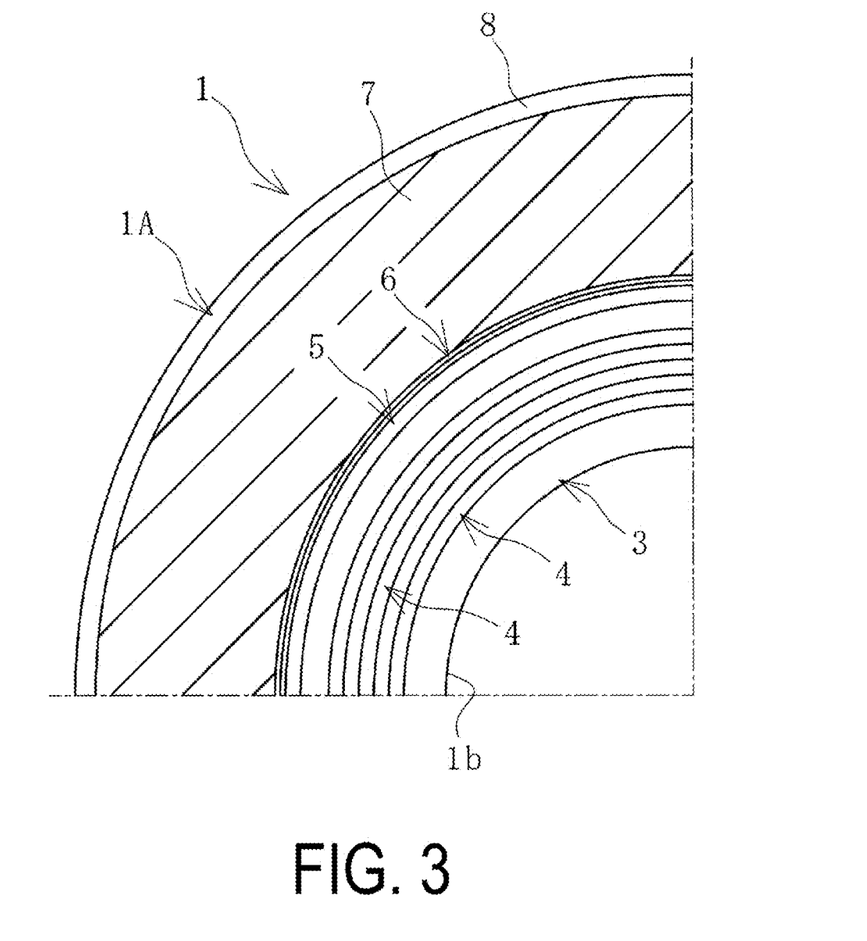
FIG. 3 is an explanatory diagram illustrating an example of a transverse cross-sectional structure of the marine hose in a cross-sectional view taken along A-A of FIG. 2.

As illustrated in FIGS. 2 and 3 as an example, the hose body 1A extending between the nipples 2b at both ends is configured by layering an inner surface layer 3, inner circumferential side reinforcing layer groups 4, a body wire layer 5, an outer circumferential side reinforcing layer group 6, a buoyant layer 7, and a cover layer 8 in this order on an outer circumferential side of a flow path 1b from the inner circumferential side toward the outer circumferential side of the hose body 1A. A dot-dash line CL in the drawings is a center line extending in a hose longitudinal direction through the cross-sectional center of the marine hose 1. Although FIG. 3 illustrates a range of one-quarter of the transverse cross-section of the marine hose 1, the other range not illustrated (a range of three-quarters) also has the same structure.

The inner circumferential side of the inner surface layer 3 serves as the flow path 1b of a fluid L. Examples of the fluid L include crude oil, gasoline, and LPG. An appropriate material is selected for the inner surface layer 3 depending on the type of the fluid L, and in a case where the fluid L is crude oil or the like, the inner surface layer 3 is made of nitrile rubber or the like having excellent oil resistance.

In this embodiment, the two inner circumferential side reinforcing layer groups 4 are layered, but there may be one inner circumferential side reinforcing layer group 4. The inner circumferential side reinforcing layer group 4 and the outer circumferential side reinforcing layer group 6 are each constituted by layering a plurality of the reinforcing layers 4A and 6A. The numbers of reinforcing layers 4A and 6A are appropriately set to necessary numbers. The reinforcing layer 4A is, for example, about 4 layers to 30 layers, and the reinforcing layer 6A is, for example, about 2 layers to 10 layers.

Figure 4:
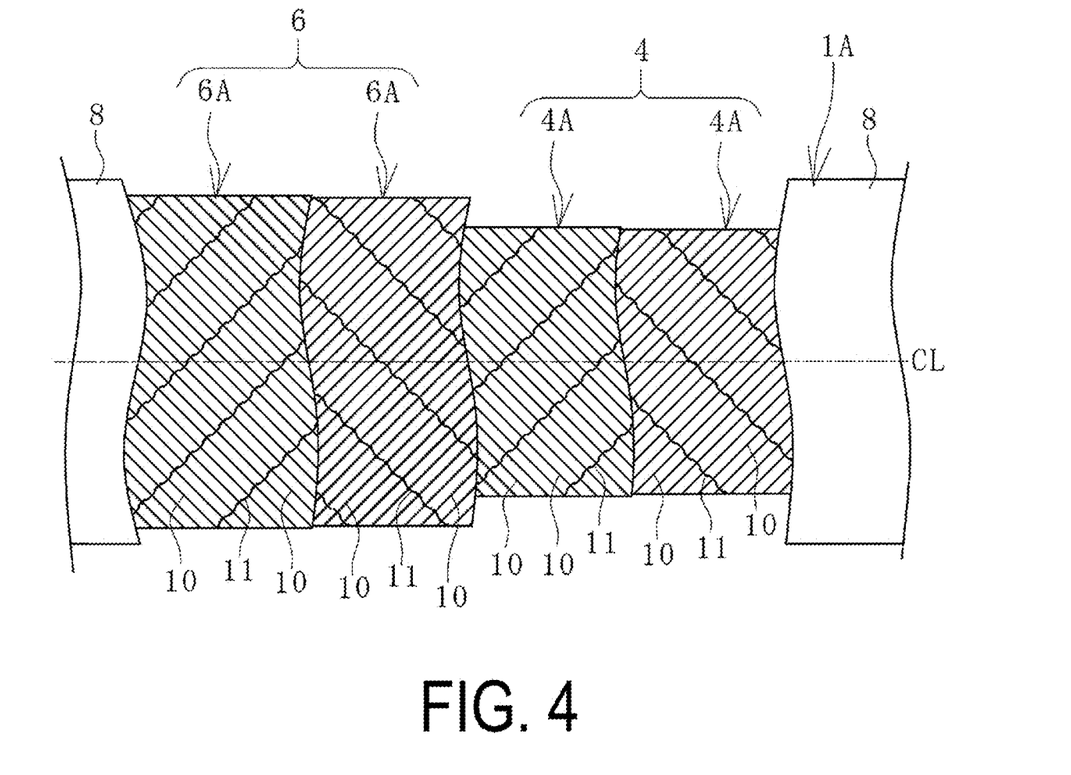
FIG. 4 is an explanatory diagram illustrating an example of reinforcing layers by cutting out a portion of the marine hose in FIG. 1.

As illustrated in FIG. 4 as an example, the respective reinforcing layers 4A and 6A have a cord fabric structure in which transverse cords 11 weaving up and down to traverse many fiber cords 10 bunched side by side are disposed in the longitudinal direction of the fiber cords 10 at intervals. In each of the reinforcing layers 4A and 6A, the many fiber cords 10 extend to be inclined at a predetermined angle with respect to a center line CL. The reinforcing layers 4A and the reinforcing layers 6A layered adjacent to one another in the vertical direction are disposed such that the inclination directions of the reinforcing cords 10 are directions opposite to one another and intersect with one another. Details of the reinforcing layers 4A and 6A will be described below.

The body wire layer 5 is configured by spirally winding metal wires around an outer circumferential rubber of the inner circumferential side reinforcing layer group 4 at predetermined intervals. The inner circumferential side reinforcing layer group 4, the body wire layer 5, and the outer circumferential side reinforcing layer group 6 are fixed to the nipple 2b by nipple wires 4w, 5w, and 6w at respective one end portions, fixing rings 2c disposed projecting on the outer circumferential surface of the nipple 2b, and the like. Between the inner circumferential side reinforcing layer group 4 and the outer circumferential side reinforcing layer group 6 is a space (a fluid accumulating layer) for storing the fluid L that has leaked from the flow path 1b.

The buoyant layer 7 is made of a material, such as sponge rubber and polyurethane foam, that exhibits buoyancy to float the marine hose 1 above the sea. Thus, the marine hose 1 is a so-called floating-type marine hose. When the marine hose 1 is a submarine type hose used in a state of being submerged in the sea, the buoyant layer 7 is omitted.

The cover layer 8 is formed of a non-water-permeable material, such as rubber, and has a line pattern or the like having excellent visibility on the surface of the cover layer 8. An appropriate material having excellent weather resistance, scratch resistance, or the like is used for the cover layer 8.

A fiber reinforced member for a marine hose 9 illustrated in FIG. 5 as an example (hereinafter referred to as a fiber reinforced member 9) is embedded in the hose body 1A as each of the reinforcing layers 4A and 6A for use. The fiber reinforced member 9 has a cord fabric structure of: the many fiber cords 10 arranged in parallel in a width direction W and extending in a longitudinal direction L; and the transverse cords 11 extending in the width direction W while weaving up and down to traverse the fiber cords 10.

The specification of the fiber reinforced member 9 is determined by the specification determination method according to an embodiment of the present invention.

The cord fabric structure is employed for the fiber reinforced member 9. The cord fabric structure reduces interference between the fiber cord 10 and the transverse cord 11, and this is advantageous in improving durability of the fiber reinforced member 9 (reinforcing layers 4A and 6A). A weaving density of the fiber cords 10 is set to, for example, 30 or more and 70 or less/5 cm, and the weaving density of the transverse cords 11 is set to, for example, 2 or more and 8 or less/5 cm. An interval (a space) of the adjacent fiber cords 10 is, for example, 0.13 mm or more and 0.25 mm or less, and more preferably 0.2 mm or more and 0.24 mm or less.

The fiber cord 10 has a specification formed by twisting three or four filaments 10a made of polyester. Although the fiber cord 10 illustrated in FIGS. 6 and 7 as an example is formed by twisting the three filaments 10a, the fiber cord 10 may have a specification formed by twisting the four filaments 10a. Each filament 10a primarily twisted in one direction is secondarily twisted in the opposite direction to the primary cable twist to form the fiber cord 10.

Figure 6:
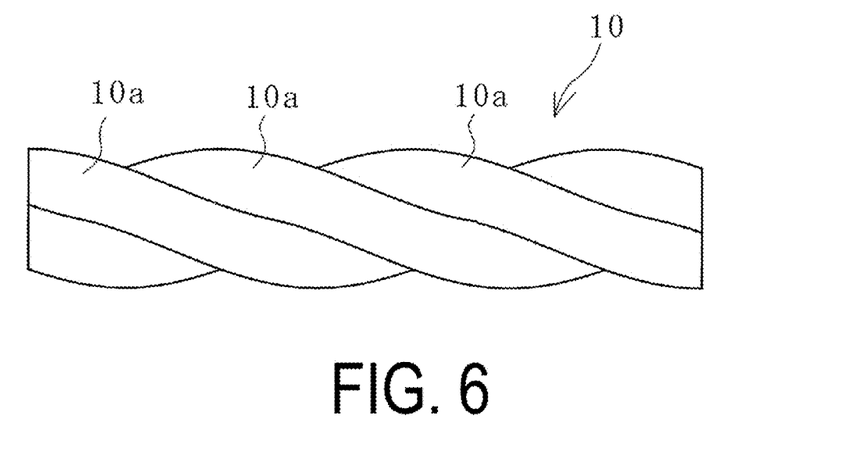
FIG. 6 is an explanatory diagram illustrating an example of a fiber cord of FIG. 5 in a side view.
Figure 7:
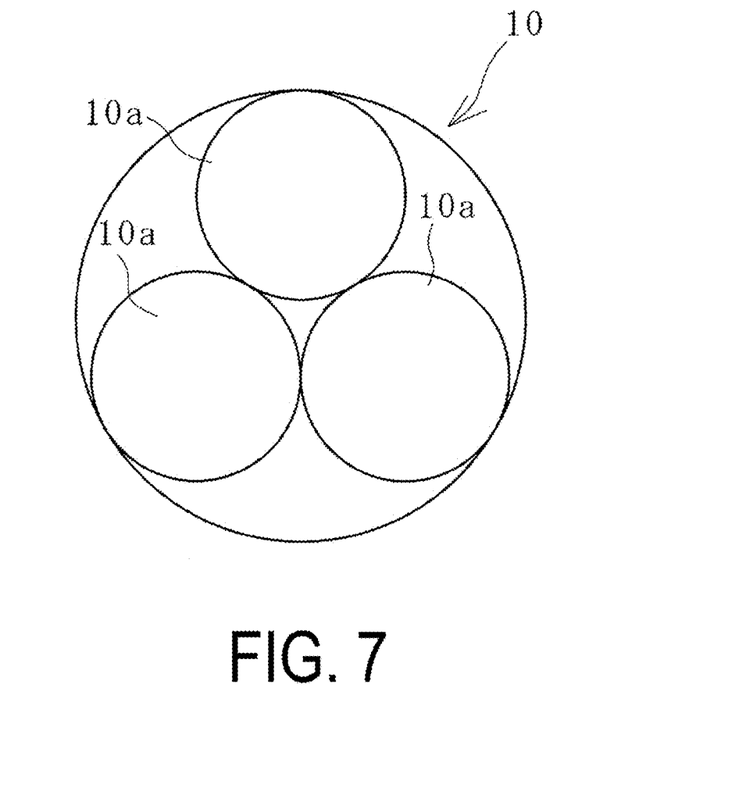
FIG. 7 is an explanatory diagram schematically illustrating an example of the fiber cord of FIG. 6 in a cross-sectional view.

Forming the fiber cord 10 by twisting the three or four filaments 10a made of polyester is advantageous in improving strength at break (cord strength) without impairing fatigue resistance of the fiber cord 10. In the fiber cord 10 formed by twisting the two filaments 10a, it is difficult to improve the cord strength, and when the filament 10a is made thick to improve the cord strength, the weight increases, and the weight increase becomes excessive with the used amount for one marine hose. In addition, thicknesses of the fiber cords 10 (the reinforcing layers 4A and 6A) increase, which leads to an increase in the diameter of the marine hose 1. In addition, in the fiber cord 10 formed by twisting the five or more filaments 10a, an outer diameter of the cord becomes excessively large, and fatigue resistance is likely to be impaired. To reduce the weight of the fiber cord 10 and to improve the fatigue resistance, it is preferable to form the fiber cord 10 by twisting the three filaments 10a, not the four filaments 10a.

Furthermore, the strength at break of the fiber cord 10 in the original state (an initial cord strength) is preferably 300 N/cord or more, more preferably 320 N/cord or more. When the initial cord strength is set to this level, it is advantageous to stably ensure the pressure resistance of the marine hose 1.

An outer diameter of the fiber cord 10 is set to, for example, 0.80 mm or more and 0.95 mm or less. When the outer diameter is less than 0.80 mm, it is difficult to ensure the cord strength of the fiber cord 10, and as a result, it is disadvantageous to improve the pressure resistance of the marine hose 1. On the other hand, when the outer diameter is more than 0.95 mm, it is disadvantageous to reduce the weight of the fiber cord 10 and the weight of the fiber cord 10 is excessively increased with the used amount for one marine hose. In addition, the thicknesses of the fiber cords 10 (the reinforcing layers 4A and 6A) increase, which leads to the increase in the diameter of the marine hose 1.

In the fiber reinforced member 9, a twist coefficient K of the fiber cord 10 calculated by the following formula (1) is set to 1900 or more and 2900 or less.

$$\text{Twist coefficient } K = T \times D^{1/2} \tag{1}$$

Here, T is a secondary cable twist count of the fiber cord (count/10 cm) and D is the total fineness of the fiber cord (dtex).

When the twist coefficient K of the fiber cord 10 is less than 1900, it is disadvantageous to ensure the fatigue resistance of the fiber cord 10. On the other hand, when the twist coefficient K is more than 2900, the cord strength of the fiber cord 10 is significantly reduced. Therefore, to avoid the decrease in the cord strength while ensuring the fatigue resistance of the fiber cord 10, the twist coefficient K is preferably set to 1900 or more and 2900 or less, and more preferably set to 1950 or more and 2600 or less. Setting the twist coefficient K in such a range is advantageous in stably ensuring the sufficient pressure resistance of the marine hose 1. In addition, it is not necessary to excessively layer the reinforcing layers 4A and 6A to ensure the sufficient pressure resistance of the marine hose 1.

The marine hose 1 is required to have a hose elongation ratio E1 of a standard value or less in a predetermined expansion test. A specific method of the predetermined expansion test is as follows.

First, an internal pressure of 0.7 bars is applied to the marine hose 1 to measure a hose length (an initial hose length). Next, the internal pressure is increased from 0.7 bars to half of a rated pressure for 5 minutes and held for 10 minutes. Thereafter, the length of the hose (the rated pressure hose length) is measured in a state where the internal pressure is brought to 0, then increased to the rated pressure for 5 minutes, and held for 10 minutes.

The hose elongation ratio E1 is calculated by (the rated pressure hose length−initial hose length)/initial hose length× 100%. The standard value of the hose elongation ratio E1 is 2.5% or less. When the hose elongation ratio E1 is 2.5% or less, it is evaluated as pass, and when it exceeds 2.5%, it is evaluated as fail.

Therefore, in the produced marine hose 1, the hose elongation ratio E1 in the predetermined expansion test needs to be the standard value (2.5%) or less. When the elongation of the fiber cord 10 is large, the marine hose 1 in which the fiber reinforced member 9 including the fiber cords 10 as the constituent members is embedded as the reinforcing layers 4A and 6A tends to be easily elongated when an internal pressure is applied. That is, it is considered that there is a relatively high correlativity between a predetermined elongation ratio E2 of the fiber cord 10 and the hose elongation ratio E1.

Therefore, in this embodiment, data of an interrelationship R between the predetermined elongation ratio E2 of the plurality of types of the fiber cords 10 having different specifications and the hose elongation ratio E1 in the above-described predetermined expansion test of each marine hose 1 in which the fiber reinforced member 9 including the fiber cords 10 as the constituent members are embedded as the reinforcing layers 4A and 6A is grasped in advance. In other words, the predetermined expansion test is previously performed in advance in relation to a plurality of marine hoses including different fiber reinforced members 9 respectively formed using the plurality of types of the fiber cords 10 having the different specifications, to thereby grasp the interrelationship R between the predetermined elongation ratio E2 of the plurality of types of the fiber cords 10 having different specifications and the hose elongation ratio E1.

For example, the plurality of fiber cords 10 having the different predetermined elongation ratios E2 are prepared, and test samples of the marine hoses 1 are produced using the fiber reinforced member 9 including the respective fiber cords 10 as the constituent members. The hose elongation ratio E1 is obtained by actual measurement using the test sample of each marine hose 1. Alternatively, the hose elongation ratio E1 may be obtained by computer simulation of a predetermined expansion test of the marine hose 1. As the predetermined elongation ratio E2 of the fiber cord 10, for example, an elongation ratio at about tensile stress acting on the fiber cord 10 when the marine hose 1 is used or any tensile stress equal to or less than the tensile stress is employed.

Figure 8:
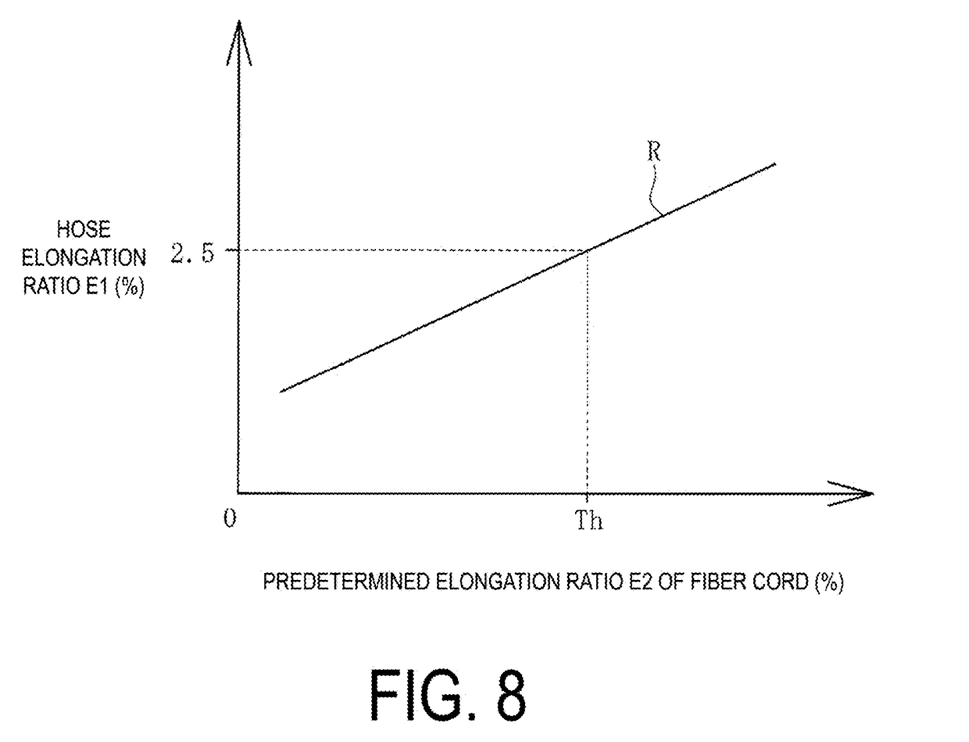
FIG. 8 is a graph illustrating an example of an interrelationship between an elongation ratio of a fiber cord of a fiber reinforced member embedded as a reinforcing layer in a marine hose and a hose elongation ratio in a predetermined expansion test of the marine hose in which the fiber reinforced member was embedded as a reinforcing layer.

For example, the data of the interrelationship R between the hose elongation ratio E1 and the predetermined elongation ratio E2 of the fiber cord 10 as illustrated in FIG. 8 is grasped. When the specifications of the fiber reinforced member 9 are determined, a threshold Th of the predetermined elongation ratio E2 of the fiber cord 10 to be used is set based on the standard value (2.5%) of the hose elongation ratio E1 and the grasped interrelationship R. The predetermined elongation ratio E2 of the fiber cord 10 of the fiber reinforced member 9 used as the reinforcing layers 4A and 6A of the marine hose 1 is set to be equal to or less than the set threshold Th.

In the marine hose 1 in which the fiber reinforced members 9 including the fiber cords 10 having the predetermined elongation ratio E2 of equal to or less than the threshold Th as the constituent members are embedded as the reinforcing layers 4A and 6A, the hose elongation ratio E1 in the above-described predetermined expansion test can be made more accurately at the standard value (2.5%) or less. That is, in the marine hose 1, excessive elongation of the hose body 1A when the internal pressure is applied is avoided, which is advantageous for appropriately maintaining the expansion characteristics of the marine hose 1.

The inventor of the present application confirmed and analyzed the correlativity between the elongation ratio of the fiber cord 10 at various tensile stresses as the predetermined elongation ratio E2 and the hose elongation ratio E1. As a result, it was found that the correlativity between the elongation ratio E2 at 1.3 cN/dtex of the fiber cord 10 and the hose elongation ratio E1 was very high.

Therefore, to determine the specifications of the fiber reinforced member 9, the data of the interrelationship R between the hose elongation ratio E1 in the above-described predetermined expansion test and the elongation ratio E2 at 1.3 cN/dtex of the fiber cord 10 embedded in the marine hose 1 is preferably grasped. Then, it is preferable to set the threshold Th of the predetermined elongation ratio E2 of the fiber cord 10 based on the standard value (2.5%) of the hose elongation ratio E1 and the grasped interrelationship R. By using the fiber cord 10 in which the predetermined elongation ratio E2 is the threshold Th or less, the hose elongation ratio E1 in the above-described predetermined expansion test can be made more accurately the standard value (2.5%) or less.

When the interrelationship R is used, by setting the elongation ratio E2 at 1.3 cN/dtex of the fiber cord 10 to 6.5% or less, the hose elongation ratio E1 of the marine hose 1 having various specifications can be set to approximately the standard value (2.5%) or less. Therefore, to simply set the threshold Th, the threshold Th is preferably set to the elongation ratio E2 (6.5%) at 1.3 cN/dtex of the fiber cord 10.

That is, the elongation ratio E2 at 1.3 cN/dtex of the fiber cord 10 used for the fiber reinforced member 9 embedded as the reinforcing layers 4A and 6A is preferably 6.5% or less. To suppress the hose elongation ratio E1, the elongation E2 at 1.3 cN/dtex of the fiber cord 10 is preferably 5.5% or less and more preferably 5.0% or less. A lower limit value of the elongation ratio at 1.3 cN/dtex of the fiber cord 10 is, for example, 3%.

The predetermined elongation ratio E2 (such as the elongation ratio at 1.3 cN/dtex) of the fiber cord 10 can be adjusted to a desired range by the known method. For example, the predetermined elongation ratio E2 is adjusted to the desired range by adjusting at least one kind of a heating temperature, a magnitude of tension, and a speed (time) in the heat treatment of the fiber cord 10 by the known method, by using an equivalent, suitable polyester yarn, or the like.

In the fiber reinforced members 9 (the reinforcing layers 4A and 6A), since the transverse cords 11 hardly affect performances and characteristics of the fiber cords 10, any known specifications can be employed. The outer diameter of the transverse cord 11 may be smaller than the outer diameter of the fiber cord 10.

Values measured compliant with JIS L1017: 2002 are used as the predetermined elongation ratio E2 and the strength at break (the cord strength) of the fiber cord 10. Note that the cord strength of the fiber cord 10 slightly changes between before vulcanization and after vulcanization, but can be considered to be substantially the same.

Figure 9:
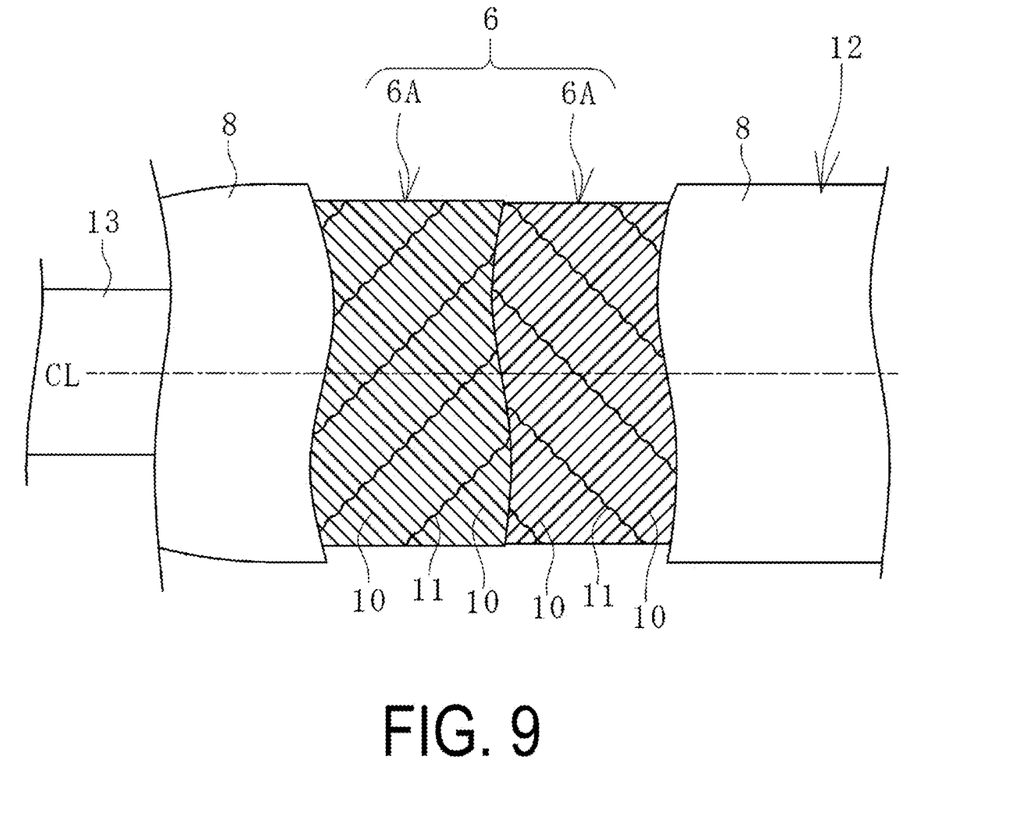
FIG. 9 is an explanatory diagram illustrating an example of a partially cutout unvulcanized hose molded article in FIG. 9.

The marine hose 1 may be produced by the known method in which the connection fittings 2 are externally fitted onto a cylindrical mandrel 13, and the constituent members of the hose body 1A illustrated in FIG. 2 as an example (the inner surface layer 3, the inner circumferential side reinforcing layer group 4, the body wire layer 5, the outer circumferential side reinforcing layer group 6, the buoyant layer 7, and the cover layer 8) are layered in this order on the outer circumferential side of the mandrel 13. The fiber reinforced member 9 is covered with a known adhesive rubber and embedded between the inner surface layer 3 and the cover layer 8 as the reinforcing layers 4A and 6A. As a result, a hose molded article 12 illustrated in FIG. 9 as an example is molded.

Figure 10:
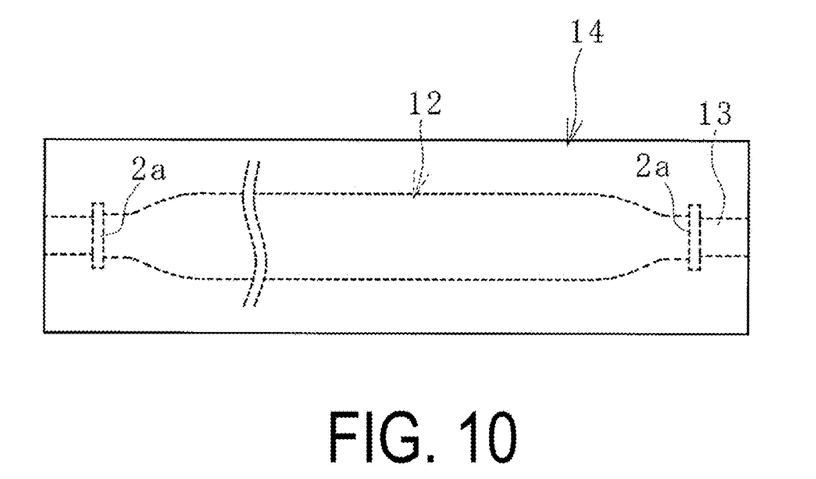
FIG. 10 is an explanatory diagram illustrating an example of a vulcanization step of the hose molded article in FIG. 9.

Next, as illustrated in FIG. 10 as an example, the hose molded article 12 is disposed in a known vulcanization device 14 and vulcanized. By this vulcanization step, the unvulcanized rubber and the adhesive rubber contained in the constituent members of the hose molded article 12 are vulcanized, and the respective layered constituent members are joined and integrated, whereby the marine hose 1 is produced.

As described above, according to an embodiment of the present invention, the fiber reinforced member 9 has the cord fabric structure in which the many fiber cords 10 formed by twisting the three or four filaments 10a made of polyester are arranged in parallel, the twist coefficient K of the fiber cords 10 is set to 1900 or more and 2900 or less, and the predetermined elongation ratio E2 of the fiber cords 10 is set to the above-described threshold Th or less. By satisfying these requirements at the same time, the fatigue resistance of the fiber cord 10 is improved, the elongation is appropriately suppressed, and the sufficient cord strength can be obtained. Since there is a synergistic effect obtained by satisfying these requirements at the same time, in the marine hose 1 in which the fiber reinforced members 9 are embedded as the reinforcing layers 4A and 6A, excessive elongation of the hose body 1A when an internal pressure is applied is avoided, and the expansion characteristics of the marine hose 1 are appropriately maintained, which is very advantageous for ensuring sufficient pressure resistance.

EXAMPLE

A total of 12 types of Conventional Example, Examples 1 to 6, and Comparative Examples 1 to 5 were prepared by differentiating specifications of fiber cords formed by twisting filaments made of polyester as shown in Table 1. The twist coefficient K in Table 1 is a value calculated by the above-described formula (1). In Table 1, in Comparative Examples 4 and 5 in which an interval between the fiber cords is a negative value, it means that the adjacent fiber cords arranged in parallel interfere with one another. The fiber cords having the respective specifications were subjected to the following tensile test and fatigue test.

Tensile Test of Fiber Cord

The strength at break of each fiber cord was measured compliant with JIS L1017: 2002, and the elongation ratio E2 at 1.3 cN/dtex was calculated from the measurement data. The test results are as shown in Table 1.

Fatigue Test of Fiber Cord

Figure 5:
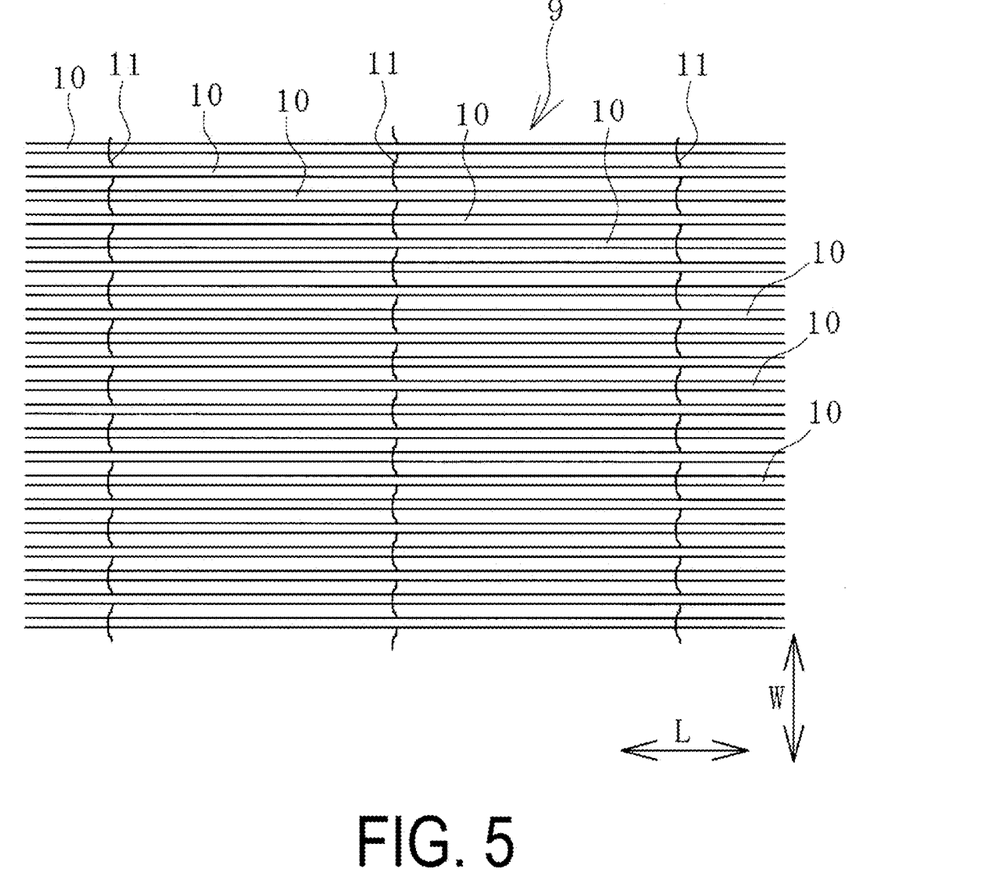
FIG. 5 is an explanatory diagram illustrating an example of a fiber reinforced member for the marine hose used as the reinforcing layer of FIG. 4 laid flat in a plan view.

Compliant with disk fatigue strength (Goodrich method) specified in JIS L1017: 2002 Annex 1, 2.2.2, a rubber test piece in which each fiber cord was embedded was rotated in a 1400 rpm under a room temperature condition to give a strain of +15% by 2000000 times for 24 hours. Strength at break of a fiber cord taken from a rubber test piece before the fatigue test (initial cord strength) and strength at break of a fiber cord taken out from the rubber test piece after the fatigue test (cord strength after the fatigue test) were measured. Then, a cord strength retention=(the cord strength after fatigue test/the initial cord strength)×100% was calculated.

illustrated in FIG. 5 as an example, which were different only in the fiber cords, were prepared. The transverse cords were fibers made of cotton and had a cord outer diameter of 0.30 mm.

Samples of marine hoses in which the respective fiber reinforced members were embedded as reinforcing layers and only the reinforcing layers were different were prepared, and the expansion test of the predetermined marine hose described above was performed. Each sample of the marine hose has a structure in which two inner circumferential side reinforcing layer groups, a body wire layer, one outer circumferential side reinforcing layer group, a buoyancy layer, and a cover layer are sequentially layered on the inner surface layer. The number of reinforcing layers constituting each inner circumferential side reinforcing layer group was 10, and the number of reinforcing layers constituting each outer circumferential side reinforcing layer group was 8. The hose elongation ratio E1 during this expansion test was measured. The test results are as shown in Table 1. The standard value of the hose elongation ratio E1 is 2.5%. When the hose elongation ratio E1 is the standard value or less, the expansion characteristic of the marine hose is evaluated as appropriate, and when the hose elongation ratio E1 exceeds the standard value, the expansion characteristic of the marine hose is evaluated as inappropriate.

TABLE 1

| | | Conventional Example | Example 1 | 2 | 3 | 4 | 5 | 6 | Comparative Example 1 | 2 | 3 | 4 | 5 |
|---|---|---|---|---|---|---|---|---|---|---|---|---|---|
| Fiber cord | Material | PET | ← | ← | ← | ← | ← | ← | ← | ← | ← | ← | ← |
| | Cord total fineness D (dtex) | 1670 | ← | ← | ← | ← | ← | ← | ← | ← | ← | ← | ← |
| | Filament (piece) | 3 | ← | ← | ← | ← | ← | 4 | 3 | ← | 2 | 6 | 5 |
| | Twist coefficient K | 1700 | 2000 | 2200 | 2350 | 2600 | 2800 | 2200 | 1800 | 3050 | 2200 | 2200 | 2200 |
| | Cord outer diameter (mm) | 0.79 | 0.84 | 0.82 | 0.82 | 0.84 | 0.85 | 0.93 | 0.79 | 0.86 | 0.66 | 1.21 | 1.07 |
| | Elongation ratio E2 at 1.3 cN/dtex (%) | 3.4 | 3.7 | 4.4 | 4.8 | 5.5 | 6.0 | 4.2 | 3.5 | 6.8 | 4.5 | 4.1 | 4.1 |
| | Initial cord strength (N) | 357 | 336 | 332 | 322 | 309 | 301 | 430 | 349 | 286 | 234 | 626 | 528 |
| | Cord strength after fatigue test (N) | 214 | 269 | 299 | 293 | 284 | 280 | 370 | 244 | 272 | 206 | 532 | 459 |
| | Cord strength retention (%) | 60 | 80 | 90 | 91 | 92 | 93 | 86 | 70 | 95 | 88 | 85 | 87 |
| Fiber reinforced member | Interval between fiber cords (mm) | 0.27 | 0.22 | 0.24 | 0.24 | 0.22 | 0.21 | 0.13 | 0.27 | 0.19 | 0.40 | −0.16 | −0.02 |
| Marine Hose | Hose elongation ratio E1 (%) | 1.2 | 1.4 | 1.7 | 1.8 | 2.1 | 2.3 | 1.6 | 1.3 | 2.6 | 1.8 | 1.5 | 1.5 |

A reference value of the initial cord strength is 300 N/piece, and when the initial cord strength is the reference value or more, it is evaluated that the strength is sufficient, and when the initial cord strength is less than the reference value, it is evaluated that the strength is insufficient.

The reference value of the cord strength retention is 75%, the cord strength retention being this reference value or more is evaluated as having sufficient fatigue resistance, and the cord strength retention being less than this reference value is evaluated as having insufficient fatigue resistance.

In addition, using the respective fiber cords, 12 types of fiber reinforced layers having a cord fabric structure (a weave density of the fiber cords of 48 pieces/5 cm and a weave density of the transverse cords of 4 pieces/cm) as From the results of Table 1, in Examples 1 to 6, all of the initial cord strength, the cord strength retention, and the hose elongation ratio E1 of the fiber cord satisfy the reference values (standard values). Therefore, it can be seen that the fiber cords corresponding to Examples 1 to 6 are excellent in fatigue resistance, and the marine hoses corresponding to Examples 1 to 6 can ensure sufficient pressure resistance while appropriately maintaining expansion characteristics.

REFERENCE SIGNS LIST

1 Marine hose
1A Hose body
1b Flow path

2 Connection fitting
2a Flange
2b Nipple
2c Fixing ring
3 Inner surface layer
4 Inner reinforcing layer
4A Reinforcing layer
4w Nipple wire
5 Body wire layer
5w Nipple wire
6 Outer reinforcing layer
6A Reinforcing layer
6w Nipple wire
7 Buoyant layer
8 Cover layer
9 Fiber reinforced member
10 Fiber cord
10a Filament
11 Transverse cord
12 Hose molded article
13 Mandrel
14 Vulcanization device
L Fluid

The invention claimed is:

1. A specification determination method of a fiber reinforced member having a cord fabric structure used as a reinforcing layer of a marine hose, the fiber reinforced member comprising fiber cords arranged in parallel and a transverse cord transversing the fiber cords so as to weave the fiber cords, the specification determination method, comprising:

setting a twist coefficient K of the fiber cords calculated by a following formula (1) to 1900 or more and 2900 or less with a specification of the fiber cords in which three or four filaments made of polyester are twisted, twist coefficient $K = T \times D^{1/2}$ ... (1), in which T is a secondary cable twist count of the fiber cords (count/10 cm) and D is a total fineness of fiber cord (dtex);

grasping an interrelationship between a predetermined elongation ratio of a plurality of types of the fiber cords having different specifications and a hose elongation ratio in a predetermined expansion test of each marine hoses in which the fiber reinforced member comprising the respective fiber cords as constituent members is embedded as the reinforcing layer in advance by previously performing the predetermined expansion test in relation to a plurality of marine hoses including different fiber reinforced members respectively formed using plurality of types of the fibers cords having the different specifications;

setting a threshold of the predetermined elongation ratio based on a standard value of the hose elongation ratio in the predetermined expansion test required for the marine hose and the interrelationship; and setting the predetermined elongation ratio of the fiber cords used as the reinforcing layer to the threshold or less.

2. The specification determination method of the fiber reinforced member according to claim 1, wherein the predetermined elongation ratio is set to an elongation ratio of the fiber cords at 1.3 cN/dtex.

3. The specification determination method of the fiber reinforced member according to claim 2, wherein 6.5% of the elongation ratio at 1.3 cN/dtex of the fiber cords is used as the threshold.

4. The specification determination method of the fiber reinforced member according to claim 1, wherein the twist coefficient K is set to 1950 or more and 2600 or less, and a strength at break of the fiber cords is set to 300 N or more.

5. The specification determination method of the fiber reinforced member according to claim 1, wherein each of the fiber cords has a specification in which three filaments made of polyester are twisted.

6. The specification determination method of the fiber reinforced member according to claim 1, wherein each of the fiber cords has an outer diameter set to 0.80 mm or more and 0.95 mm or less.

7. A method of producing a marine hose, comprising:

embedding the fiber reinforced member having the specification determined by the specification determination method of the fiber reinforced member according to claim 1 as the reinforcing layer between an inner surface layer and a cover layer to form an unvulcanized hose molded article; and vulcanizing the hose molded article.

* * * * *